United States Patent
Wang et al.

(10) Patent No.: US 11,220,560 B2
(45) Date of Patent: Jan. 11, 2022

(54) UNIVERSAL ALPHA-OLEFIN POLYMERIZATION CATALYST, AND APPLICATION THEREOF

(71) Applicants: Yingkou Xiangyang Catalyst Co., Ltd., Liaoning (CN); Dalian University of Technology, Liaoning (CN)

(72) Inventors: Licai Wang, Liaoning (CN); Zhanxian Gao, Liaoning (CN); Limei Yu, Liaoning (CN); Huan Wang, Liaoning (CN); Wei Li, Liaoning (CN); Guotong Zheng, Liaoning (CN); Qingxin Dong, Liaoning (CN)

(73) Assignees: YINGKOU XIANGYANG CATALYST CO., LTD., Liaoning (CN); DALIAN UNIVERSITY OF TECHNOLOGY, Liaoning (CN)

( * ) Notice: Subject to any disclaimer, the term of this patent is extended or adjusted under 35 U.S.C. 154(b) by 97 days.

(21) Appl. No.: 16/335,929

(22) PCT Filed: Oct. 25, 2017

(86) PCT No.: PCT/CN2017/107601
§ 371 (c)(1),
(2) Date: Mar. 22, 2019

(87) PCT Pub. No.: WO2018/050127
PCT Pub. Date: Mar. 22, 2018

(65) Prior Publication Data
US 2019/0309099 A1 Oct. 10, 2019

(30) Foreign Application Priority Data

Sep. 29, 2017 (CN) .......................... 201710908838.4

(51) Int. Cl.
*C08F 4/642* (2006.01)
*C08F 4/659* (2006.01)
*C08F 10/00* (2006.01)
*C08F 210/16* (2006.01)
*B01J 19/18* (2006.01)
*C08F 2/34* (2006.01)
*C08F 4/649* (2006.01)
*C08F 210/06* (2006.01)
*C08F 110/06* (2006.01)
*C08F 4/646* (2006.01)
*C08F 2/01* (2006.01)

(52) U.S. Cl.
CPC ......... *C08F 4/6425* (2013.01); *B01J 19/1868* (2013.01); *C08F 2/34* (2013.01); *C08F 4/646* (2013.01); *C08F 4/649* (2013.01); *C08F 4/6494* (2013.01); *C08F 4/65916* (2013.01); *C08F 10/00* (2013.01); *C08F 110/06* (2013.01); *C08F 210/06* (2013.01); *C08F 210/16* (2013.01); *C08F 2/01* (2013.01)

(58) Field of Classification Search
CPC .... C08F 4/65916; C08F 10/00; C08F 4/6425; C08F 210/16
See application file for complete search history.

(56) References Cited

U.S. PATENT DOCUMENTS

| 6,395,670 | B1 * | 5/2002 | Morini | .................... | C08F 10/00 502/104 |
| 2016/0009833 | A1 | 1/2016 | Sukhdeep et al. | | |
| 2016/0347882 | A1 | 12/2016 | Singh et al. | | |

FOREIGN PATENT DOCUMENTS

| CN | 103554312 A | 2/2014 | |
| CN | 106699932 A | 5/2017 | |
| WO | WO-2015065990 A1 * | 5/2015 | ............ C08F 210/06 |
| WO | 2018050127 A2 | 3/2018 | |

OTHER PUBLICATIONS

Wang, Licai; International Search Report and Written Opinion for serial No. PCT/CN2017/107601, filed Oct. 25, 2017, dated Mar. 15, 2018, 8 pgs.(2 pages of English Translation and 6 pages of Official copy).

* cited by examiner

*Primary Examiner* — Catherine S Branch
(74) *Attorney, Agent, or Firm* — Taylor English Duma LLP

(57) ABSTRACT

Disclosed are a universal alpha-olefin polymerization industrial catalyst, and an application thereof, specifically an industrial production catalyst which consists of (A) a solid catalyst component, (B) a cocatalyst organoaluminium compound and (C) an external electron donor compound, and is used for various alpha-olefin polymerization or copolymerization processes. The solid catalyst component (A) is prepared from a dibutyl phthalate or diisobutyl phthalate and 9,9-bis(methoxymethyl)fluorene composite internal electron donor. A hydrocarbyl alkoxy silicon, an organic acid ester or a hydrocarbyl alkoxy silicon and organic acid ester composite acts as the external electron donor component (C). The solid catalyst component (A), the cocatalyst organoaluminium compound (B) and the external electron donor compound (C) are used together in industrial devices for various alpha-olefin polymerization or copolymerization processes to produce new grades of poly-alpha-olefins.

18 Claims, No Drawings

UNIVERSAL ALPHA-OLEFIN POLYMERIZATION CATALYST, AND APPLICATION THEREOF

FIELD OF THE INVENTION

The present invention relates to the field of industrial research and applications of α-olefin polymerization or copolymerization catalysts, specifically a large-scale industrial production catalyst used universally for various alpha-olefin polymerization or copolymerization processes, and an application thereof.

DESCRIPTION OF THE BACKGROUND

Currently, Ziegler-Natta-type (Z-N) catalysts are still main catalysts for industrial olefin polymerization. The Z-N catalysts for polymerization and copolymerization of olefins, especially alpha-olefins comprise (A) a titanium-containing magnesium chloride support catalyst component, (B) a cocatalyst organoaluminium compound and (C) an external electron donor capable of adjusting the structure and properties of poly-alpha-olefins. The titanium-containing magnesium chloride support catalyst component comprises an internal electron donor, and the internal electron donor is a core of the Z-N catalyst. In the present invention, the titanium-containing magnesium chloride support catalyst component is referred to as the catalyst component. The catalyst component may be prepared by three methods: co-precipitation by reaction of a magnesium chloride alcoholate, an internal electron donor and a titanium compound; supporting a titanium compound and an internal electron donor on a spherical magnesium chloride alcoholate support; and reaction of magnesium chloride generated from diethoxymagnesium and a titanium chloride compound with an internal electron donor.

The internal electron donor is a core of the Z-N catalyst, because the internal electron donor plays a key action in adjusting the catalyst activity and the structure of the poly-alpha-olefins, and is a core component of the catalyst component. However, it is not an easy task to develop an industrial production internal electron donor used for various processes. There are a small number of internal electron donors widely used in the industry and the internal electron donors have limited performance, which is difficult to satisfy the demands of the growing polyolefin industry. Recently, it is found that the use of a composite of two or more electron donors as an internal electron donor can produce a synergistic effect so as to obtain the performance different that of a single internal electron donor. The composite internal electron donor combines the advantages of the respective electron donors and even has new properties due to the synergistic effect. The performance of the catalyst component prepared using a composite of two electron donors as an internal electron donor can be adjusted, so as to obtain poly-alpha-olefins meeting various growing grades and special performance and catalyst components meeting the industrial demands. The preparation of a catalyst component using a composite of two electron donors as an internal electron donor is a new idea and a new method for developing new catalyst components having excellent overall performance or some good performance. Although there are many researches on using a composite of two electron donors as an internal electron donor, a universal industrial production catalyst component suitable for various processes has not been reported.

An internal electron donor as a composite internal electron donor for industrial polymerization catalysts must meet basic requirements in industrial production, such as stable source, low price, stable performance, special performance, and adjustable performance, etc.

Dibutyl phthalate and diisobutyl phthalate (collectively di-(n)isobutyl phthalate) are internal electron donors commonly used in current industrial Z-N catalysts, and have good overall performance and moderate price, but suffer from some problems in safety, low activity at a lower polymerization temperature, and absence of special performance for polymers. In contrast, 9,9-bis(methoxymethyl)fluorene has outstanding special performance such as high catalyst activity, low polymerization temperature, high molecular weight of polyolefins, high tacticity of polyolefins, narrow molecular weight distribution, can serve as both internal electron donor and external electron donor, and therefore, is an important electron donor.

The present applicant develops an industrial production method of 9,9-bis(methoxymethyl)fluorene (CN1166608C), and establishes a production device, and its product 9,9-bis(methoxymethyl)fluorene has been supplied to the international market.

Currently, the preparation of catalyst components using a composite of two electron donors as an internal electron donor all stay at the level of combining electron donors empirically through experimentation, and there is a lack of rational methods to guide the study of internal electron donor composite catalyst components. As result, not only a desirable preparation formulation of a composite catalyst component could not be obtained, but also great waste of internal electron donors may be caused, and screening good internal electron donors requires the performance of a large number of experiments and the consumption of a lot of time, man-power, and material resources.

SUMMARY OF THE INVENTION

The present invention selects a di-(n)isobutyl phthalate and 9,9-bis(methoxymethyl)fluorene composite as an internal electron donor in a magnesium chloride support catalyst component of an industrial Z-N catalyst, and prepares a universal industrial catalyst component for polyolefins, which is suitable for catalysts for various polymerization processes in industrial polymerization reactors.

Specifically, the catalyst product suitable for large-scale industrial preparation of poly-α-olefins in various polymerization processes according to the present invention comprises a catalyst component A, a cocatalyst alkyl aluminum B and an external electron donor C; wherein:

(1) the catalyst component A is a mixture of titanium ions and a composite internal electron donor aromatic diacid dialkyl ester and 1,3-diether supported on magnesium chloride;

(2) the cocatalyst alkyl aluminum B is triethyl aluminum, triisobutyl aluminum or a mixture thereof; more usually triethyl aluminum; and (3) the external electron donor C is an alkylalkoxysilicon or an organic acid ester, or an alkylalkoxysilicon and organic acid ester composite.

For the catalyst described in the above disclosed technical solution, in the catalyst component A, the aromatic diacid dialkyl ester is di-(n)isobutyl phthalate.

For the catalyst described in the above disclosed technical solution, in the catalyst component A, the 1,3-diether is 9,9-bis(methoxymethyl)fluorene.

For the catalyst described in the above disclosed technical solution, in the catalyst component A, the mass fraction of titanium is 2.0-3.8%, the mass fraction of magnesium is 15.0-20.0%, the mass fraction of di-(n)isobutyl phthalate is 1.0-7.0%, and the mass fraction of 9,9-bis(methoxymethyl) fluorene is 1.0-9.0%.

For the catalyst described in the above disclosed technical solution, a molar ratio of di-(n)isobutyl phthalate and 9,9-bis(methoxymethyl) fluorene determines the performance of the catalyst component. Specifically, a molar ratio of di-(n)isobutyl phthalate and 9,9-bis(methoxymethyl) fluorene is 1-9.9:10.

By adjusting the amounts of di-(n)isobutyl phthalate and 9,9-bis(methoxymethyl) fluorene, a series of polymerization catalysts are obtained, and thus various grades of polyolefins satisfying demands in the market are obtained. For example, a universal polypropylene film material can be produced using a Z-N catalyst component A which is a composite internal electron donor containing 2.5% of di-isobutyl phthalate and 5% of 9,9-bis(methoxymethyl) fluorene; a polypropylene wire drawing material or a polypropylene injection molding material can be produced using a Z-N catalyst component A containing 7% of di-isobutyl phthalate and 8% of 9,9-bis(methoxymethyl) fluorene by adjusting the process; or, a propylene homopolymerization product or an ethylene/propylene copolymerization product can be produced using a Z-N catalyst component A containing 4%-5% of di-isobutyl phthalate and 3%-5% of 9,9-bis(methoxymethyl) fluorene.

For the catalyst described in the above disclosed technical solution, specifically, the preparation method of the catalyst component A comprises: a). co-precipitation of a magnesium chloride alcoholate, a composite internal electron donor and titanium tetrachloride; b). supporting titanium tetrachloride and a composite internal electron donor on a spherical magnesium chloride alcoholate support; and c). supporting a composite internal electron donor on magnesium chloride generated by reaction of diethoxymagnesium and titanium tetrachloride. The methods a) to c) listed in the present invention all are known technologies and common methods for preparing the catalyst component A by those skilled in the art. For example, the applicant uses the method a) to develop some new technologies of preparation and use of the catalyst component A (CN100,491,415C, U.S. Pat. Nos. 8,344,080B$_2$, 7,964,678B$_2$).

For the catalyst described in the above disclosed technical solution, the external electron donor C is a hydrocarbyl alkoxy silicon or an organic acid ester, or an hydrocarbyl alkoxy silicon and organic acid ester composite. Specifically, the hydrocarbyl alkoxy silicon is selected from industrially commonly used external electron donors, including $C_{1-10}$ alkyltrimethoxysilicon, $C_{1-8}$dialkyldimethoxysilicon, alkylcycloalkyldimethoxysilicon, dicycloalkyldimethoxysilicon, or diphenyldimethoxysilicon. Typically, the hydrocarbyl alkoxy silicon is propyltrimethoxysilicon, diisopropyldimethoxysilicon, diisobutyldimethoxysilicon, methylcyclohexyldimethoxysilicon, dicyclopentyldimethoxysilicon, or diphenyldimethoxysilicon. The organic acid ester is a $C_{10-20}$ linear natural fatty acid $C_{3-5}$ branched alkyl ester, typically, isopropyl laurate, isoamyl laurate, isopropyl myristate, isoamyl myristate, isopropyl palmitate, or the like. The composite consisting of an alkylalkoxysilicon and a fatty acid ester is typically selected from propyltrimethoxysilicon and isopropyl myristate, dicyclopentyldimethoxysilicon and isopropyl myristate, or diphenyldimethoxysilicon and isopropyl myristate composites.

For the catalyst described in the above disclosed technical solution, specifically, a molar ratio of the hydrocarbyl alkoxy silicon and the organic acid ester is 1-9.9:10. The selection of a hydrocarbyl alkoxy silicon or an organic acid ester, or an hydrocarbyl alkoxy silicon and organic acid ester composite as the external electron donor C, and the kinds and the molar ratio of a hydrocarbyl alkoxy silicon and an organic acid ester in the composite external electron donor, depend on the ratio of di-(n)isobutyl phthalate and 9,9-bis (methoxymethyl) fluorene in the composite internal electron donor, that is, depend on grades of the produced poly-alpha-olefins.

For the catalyst described in the above disclosed technical solution, specifically, the alpha-olefin polymerization is propylene polymerization, 1-butene polymerization, ethylene and propylene copolymerization, ethylene and 1-butene copolymerization, or propylene and 1-butene copolymerization.

For the catalyst described in any one of the above disclosed technical solutions, the catalyst may be applied in large-scale industrial production of poly-α-olefins in various polymerization processes, and specifically, the application comprises: (1) gas phase reaction: α-olefin polymerization in the UNIPOL gas-phase fluidized bed reactor process, α-olefin polymerization in the NOVOLEN vertical stirred-tank gas-phase reactor process, α-olefin polymerization in the INNOVENE horizontal stirred-tank gas-phase reactor process, or α-olefin polymerization in the JPP (Chisso) horizontal stirred-tank gas-phase reactor process; (2) batch bulk reaction: α-olefin polymerization in the tank reactor polymerization process; and (3) continuous bulk reaction: α-olefin polymerization in the SPHERIPOL loop reactor process, or α-olefin polymerization in the ZHG process with one horizontal bulk reactor and one horizontal gas-phase reactor tank in series. In these processes, the most frequently applied and most important α-olefin polymerization is propylene polymerization and propylene and ethylene copolymerization processes.

For the application of the catalyst described in the above disclosed technical solution, specifically, the application comprises: producing various grades of polyolefins having different properties in the same process in the same device. The selection of the external electron donor C of the present invention varies in particular processes. For example, for propylene polymerization in the NIPOL gas-phase fluidized bed reactor polymerization process, the used external electron donor is a binary composite consisting of an alkylalkoxysilicon and a fatty acid ester. For example, a universal polypropylene can be produced using propyltrimethoxysilicon and isopropyl myristate.

The industrial catalyst of the present invention is advantageous in that:

1. It has wide applicability, including virtually all industrially used α-olefin polymerization processes.

2. It use a composite internal electron donor di-(n)isobutyl phthalate and 9,9-bis(methoxymethyl) fluorene, and the catalyst component prepared in different molar ratios has excellent adjustable performance and even results in polypropylene with special performance, so as to satisfy the requirements of grades of polypropylene.

3. It is well known that the currently common internal electron donor dibutyl phthalate has safety issues in human and animals, and 9,9-bis(methoxymethyl) fluorene can be considered as a "green" internal electron donor. The use of the dibutyl phthalate and 9,9-bis(methoxymethyl) fluorene composite will greatly reduce the amount of dibutyl phthalate.

4. For different processes, the selection of a hydrocarbyl alkoxy silicon or an organic acid ester, or an hydrocarbyl alkoxy silicon and organic acid ester composite as the external electron donor C, and the kinds and the molar ratio of an alkyl alkoxy silicon and an organic acid ester in the composite external electron donor, can achieve convenient adjustment of the performance of the catalyst.

5. A long-chain fatty acid ester is selected as a component of the external electron donor C, and may stay in the polymers as a plasticizer.

DETAILED DESCRIPTION OF THE INVENTION

The following non-limiting examples are provided to enable those skilled in the art to more fully understand the invention, and are not to be interpreted in any way as limiting the invention.

Example 1

On an introduced 600,000-ton propylene polymerization device in the UNIPOL gas-phase fluidized bed reactor process, a Z-N catalyst component A which is a composite internal electron donor containing 5% of 9,9-bis(methoxymethyl) fluorene and 2.5% of di-isobutyl phthalate, a cocatalyst triethyl aluminum, and a propyltrimethoxysilicon and isopropyl myristate composite external electron donor were used. The operation parameters were as follows: reactor temperature of 68.5-71.5° C., partial pressure of propylene of 2.7-2.8 MPag, TEAL/Ti of 60-75, $H_2/C_3$ ratio of 0.0028, and catalyst retention time of 1.29 h. Polypropylene powders were produced respectively using the catalyst of the present invention and the catalyst along with the device, and were sampled for analysis. The results are shown in a table below:

| Production line comparison | Sampling time | Melt index g/10 min | Tacticity index % | Bulk density Kg/m3 | APS mm | LT100 mesh screen fine powder % | Residual Al, ppm | Residual Ti, ppm | Residual Cl, ppm |
|---|---|---|---|---|---|---|---|---|---|
| Catalyst of the present invention | Day 18, 09:00 | 3.47 | 97.31 | 335 | 0.75 | 1.14 | 48.0 | 0.9 | 12.4 |
| Catalyst along with the device | Day 18, 09:00 | 3.30 | 96.64 | 304 | 0.81 | 1.68 | 48.9 | 0.9 | 19.8 |

By comparison, it is found that compared with polypropylene produced using the catalyst along with the device, polypropylene produced using the catalyst of the present invention has a larger tacticity index, a higher bulk density, a comparable average particle size, a lower fine powder content, and a higher activity.

Compared with the polypropylene product produced using the catalyst along with the device, the polypropylene product produced using the catalyst of the present invention has a lower ash content and a lower yellowness index.

The unit consumption of the catalyst of the present invention is lower than the unit consumption of the catalyst along with the device by 19.6% on average, the unit consumption of triethyl aluminum is lower than that for the catalyst along with the device by 30.6% on average, and the unit consumption of the external electron donor is lower than that of the imported electron donor by 32.6%.

Polypropylene produced by the present fluidized bed reactor is a universal polypropylene. The efficiency of the catalyst is 24 $kg_{PP}$/g catl.

Example 2

On an introduced propylene polymerization process device in the NOVOLEN vertical stirred-tank gas-phase reactor process with a 550,000-ton annual output, a Z-N improved catalyst of the present invention consisting of a catalyst component A containing 2.7% of titanium, 18.5% of magnesium, 8% of 9,9-bis(methoxymethyl) fluorene, and 7% of di-isobutyl phthalate, a cocatalyst triethyl aluminum, and an external electron donor methylcyclohexyldimethoxysilicon was used. The operations were performed following process parameters along with the device, and 1638.5 tons of a wire drawing material of grade 1080K, 10984.4 tons of an injection molding material of grade 1100N, and 794.9 tons of a product of grade HPPSS, all qualified, were produced. The catalyst activity is 28.85 kgpp/g catalyst. By adjusting the process parameters, the tacticity of the wire drawing material of 1080K is adjusted to the tacticity for producing a thin film material of BOPP; and by hydrogen adjusting process, the polyolefin of an injection molding material of grade 1100N is transformed to produce a product with a high melt index. The catalyst activity is equal to or greater than 46 kgpp/g catalyst.

Example 3

On a dual-reactor process with a 200,000-ton-annual-output gas-phase INNOVENE single-reactor process and an introduced 300,000-ton-annual-output INNOVENE process in series, a catalyst component A of the present invention containing 3%-5% of 9,9-bis(methoxymethyl) fluorene, 4%-5% of di-isobutyl phthalate, 2.5%-3% of titanium, and 18.0%-20% of magnesium, a cocatalyst triethyl aluminum, and an external electron donor methylcyclohexyldimethoxysilane were used. Propylene homopolymerization and ethylene/propylene copolymerization products could be produced, where the catalytic efficiency of the catalyst applied in the INNOVENE single reactor reaches 27 Kg·PP/g·cat, and the catalytic efficiency of the catalyst applied in the series dual reactor reaches 32 Kg·PP/g·cat.

Example 4

In the continuous bulk method, on a propylene polymerization device in the SPHERIPOL loop reactor process with a 300,000-ton annual output of polypropylene, a catalyst component A of the present invention containing 2% of 9,9-bis(methoxymethyl) fluorene, 6% of di-isobutyl phthalate, 2.5% of titanium, and 18.9% of magnesium, a cocatalyst triethyl aluminum, and a typical external electron donor diisopropyldimethoxysilicon were used. The operations were performed following the production process parameters of the device (including prepolymerization) and the use evaluation conclusions were obtained: (1) the operation condition of the device is normal; (2) the activity is up to 52 kgPP/g cat, the hydrogen adjusting sensitivity is good, the tacticity of polypropylene is relatively high, and the fine powder amount in polypropylene is relatively low; (3) the control requirements in product quality can be satisfied; and (4) the use requirements in use can be satisfied.

We claim:

1. A catalyst for large-scale industrial preparation of poly-α-olefins in various polymerization processes, comprising a catalyst component A, a cocatalyst alkyl aluminum B, and an external electron donor C;
wherein:
(1) the catalyst component A consists of titanium ions and a composite internal electron donor aromatic diaciddialkyl ester and 1,3-diether supported on magnesium chloride;
(2) the cocatalyst alkyl aluminum B is triethyl aluminum, triisobutyl aluminum or a mixture thereof; and
(3) the external electron donor C comprises an organic acid ester or a hydrocarbylalkoxy silicon and organic acid ester composite, and
wherein the cocatalyst alkylaluminum B and titanium ions (Ti) have a molar ratio in the range of 60-75.

2. The catalyst according to claim 1, wherein in the catalyst component A, the aromatic diaciddialkyl ester is diisobutyl phthalate.

3. The catalyst according to claim 2, wherein in the catalyst component A, the 1,3-diether is 9,9-bis(methoxymethyl)fluorene.

4. The catalyst according to claim 3, wherein in the catalyst component A, the mass fraction of titanium is 2.0-3.8%, the mass fraction of magnesium is 15.0-20.0%, the mass fraction of diisobutyl phthalate is 1.0-7.0%, and the mass fraction of 9,9-bis(methoxymethyl)fluorene is 1.0-9.0%.

5. The catalyst according to claim 3, wherein a molar ratio of diisobutyl phthalate and 9,9-bis(methoxymethyl) fluorene is 1-9.9:10.

6. The catalyst according to claim 1, wherein the preparation method of the catalyst component A comprises one of a)-c):
a) co-precipitation of a magnesium chloride alcoholate, a composite internal electron donor and titanium tetrachloride;
b) supporting titanium tetrachloride and a composite internal electron donor on a spherical magnesium chloride alcoholate support; or
c) supporting a composite internal electron donor on magnesium chloride generated by reaction of diethoxymagnesium and titanium tetrachloride.

7. The catalyst according to claim 1,
wherein:
the organic acid ester is a $C_{10-20}$ linear natural fatty acid $C_{3-5}$ branched alkyl ester; and
the hydrocarbylalkoxy silicon and organic acid ester composite is selected from the group consisting of propyltrimethoxysilicon and isopropyl myristate, dicyclopentyldimethoxysilicon and isopropyl myristate, and diphenyldimethoxysilicon and isopropyl myristate composites.

8. The catalyst according to claim 1, wherein a molar ratio of the hydrocarbylalkoxy silicon and the organic acid ester is 1-9.9:10.

9. The catalyst according to claim 1, wherein the alpha-olefin polymerization is propylene polymerization, 1-butene polymerization, ethylene and propylene copolymerization, ethylene and 1-butene copolymerization, or propylene and 1-butene copolymerization.

10. A method of using the catalyst according to claim 1 in large-scale industrial production of poly-α-olefins in a polymerization process, the method comprising:
providing the catalyst according to claim 1, contacting the catalyst with an α-olefin to effect polymerization of the α-olefin;
wherein the process comprises:
(1) a gas phase reaction which is: α-olefin polymerization in a gas-phase fluidized bed reactor process, α-olefin polymerization in a vertical stirred-tank gas-phase reactor process, α-olefin polymerization in a horizontal stirred-tank gas-phase reactor process, or α-olefin polymerization in the a horizontal stirred-tank gas-phase reactor process;
(2) a batch bulk reaction which is an α-olefin polymerization process in a tank reactor; or
(3) a continuous bulk reaction which is an α-olefin polymerization process in a loop reactor process or α-olefin polymerization process having one horizontal bulk reactor and one horizontal gas-phase reactor tank arranged in series.

11. The method of claim 10, wherein the catalyst is according to claim 4.

12. The method of claim 10, wherein the catalyst is according to claim 5.

13. The method of claim 10, wherein the catalyst is according to claim 8.

14. The catalyst according to claim 1, wherein in the catalyst component A, the aromatic diaciddialkyl ester is di-n-butyl phthalate.

15. The catalyst according to claim 14, wherein in the catalyst component A, the 1,3-diether is 9,9-bis(methoxymethyl)fluorene.

16. The catalyst according to claim 15, wherein a molar ratio of di-n-butyl phthalate and 9,9-bis(methoxymethyl) fluorene is 1-9.9:10.

17. The catalyst according to claim 15, wherein in the catalyst component A, the mass fraction of titanium is 2.0-3.8%, the mass fraction of magnesium is 15.0-20.0%, the mass fraction of di-n-butyl phthalate is 1.0-7.0%, and the mass fraction of 9,9-bis(methoxymethyl)fluorene is 1.0-9.0%.

18. A catalyst for large-scale industrial preparation of poly-α-olefins in various polymerization processes, comprising a catalyst component A, a cocatalyst alkyl aluminum B, and an external electron donor C;
wherein:
(1) the catalyst component A consists of titanium ions and a composite internal electron donor aromatic diaciddialkyl ester and 1,3-diether supported on magnesium chloride;
(2) the cocatalyst alkyl aluminum B is triethyl aluminum, triisobutyl aluminum or a mixture thereof; and
(3) the external electron donor C is a hydrocarbylalkoxy silicon, an organic acid ester or a hydrocarbylalkoxy silicon and organic acid ester composite, and
wherein the cocatalyst alkylaluminum B and titanium ions (Ti) have a molar ratio in the range of 60-75.

* * * * *